US009042043B2

(12) United States Patent
Kirii (10) Patent No.: US 9,042,043 B2
(45) Date of Patent: May 26, 2015

(54) LENS HOLDER DRIVING DEVICE CAPABLE OF ENSURING LINEARITY OF WIDE RANGE IN DRIVING RESPONSE

(71) Applicant: Atsushi Kirii, Tokyo (JP)

(72) Inventor: Atsushi Kirii, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 76 days.

(21) Appl. No.: 13/845,035

(22) Filed: Mar. 17, 2013

(65) Prior Publication Data

US 2014/0118854 A1 May 1, 2014

(30) Foreign Application Priority Data

Oct. 31, 2012 (JP) ................................. 2012-241069

(51) Int. Cl.
*G02B 7/02* (2006.01)
*G02B 7/09* (2006.01)
*G02B 7/08* (2006.01)
*G02B 13/00* (2006.01)

(52) U.S. Cl.
CPC .. *G02B 7/09* (2013.01); *G02B 7/08* (2013.01); *G02B 13/001* (2013.01)

(58) Field of Classification Search
CPC .......... G02B 7/08; G02B 7/102; G02B 7/028; G02B 7/14; G02B 7/023; G02B 7/04; G02B 7/026; G02B 25/002; G02B 7/021; G02B 7/02; G03B 17/14; G11B 7/0932; G11B 7/0935
USPC ......... 359/694, 813–814, 821–830, 696, 808, 359/811, 819
See application file for complete search history.

(56) References Cited

U.S. PATENT DOCUMENTS

| 7,706,088 B2 * | 4/2010 | Chung ........................... 359/823 |
| 2008/0192124 A1 * | 8/2008 | Nagasaki ................. 348/208.11 |
| 2010/0002317 A1 * | 1/2010 | Osaka et al. ................... 359/824 |
| 2012/0057252 A1 * | 3/2012 | Ishiguro et al. ............... 359/824 |

FOREIGN PATENT DOCUMENTS

| JP | 2009-251031 A | 10/2009 |
| JP | 2010-197719 A | 9/2010 |
| JP | 2012-113186 A | 6/2012 |

OTHER PUBLICATIONS

Japanese Office Action dated Oct. 2, 2013 (and English translation thereof) in counterpart Japanese Application No. 2012-241069.

* cited by examiner

*Primary Examiner* — Dawayne A Pinkney
(74) *Attorney, Agent, or Firm* — Holtz, Holtz, Goodman & Chick PC (57) ABSTRACT

A lens holder driving device includes a lens holder in which a lens assembly is mounted, a driving coil fixed to the lens holder at outside circumference thereof, an outer yoke including an outer hollow cylindrical portion and an ring-shaped end portion disposed an upper end of the outer hollow cylindrical portion, a magnet disposed to an inner wall surface of the outer hollow cylindrical portion so as to be opposite to the driving coil, an elastic member supporting the lens holder in a direction of an optical axis shiftably, and a base disposed at a lower side of the lens holder. The lens holder driving device includes a contact area reduction arrangement reducing a contact area between the ring-shaped end portion of the outer yoke and an upper end portion of the lens holder.

12 Claims, 12 Drawing Sheets

LENS HOLDER DRIVING DEVICE CAPABLE OF ENSURING LINEARITY OF WIDE RANGE IN DRIVING RESPONSE

This application is based upon and claims the benefit of priority from Japanese Patent Application No. JP 2012-241069, filed on Oct. 31, 2012, the disclosure of which is incorporated herein in its entirety by reference.

BACKGROUND OF THE INVENTION

This invention relates to a lens holder driving device and, in particular, to an autofocus lens holder driving device for use in a compact camera.

Mobile terminals such as camera-equipped cellular mobile phones almost mount compact cameras therein. The compact camera is provided with an autofocus lens holder driving device. Previously, various autofocus lens holder driving devices have been proposed.

By way of illustration, Japanese Unexamined Patent Application Publication No. 2009-251031 (JP-A-2009-251031) (which will be also called Patent Document 1) discloses a lens driving device which is capable of decreasing a parts count and of miniaturizing. The lens driving device disclosed in Patent Document 1 comprises a lens holder in which a lens assembly can be mounted, a driving coil fixed to the lens holder at outside circumstance thereof, a permanent magnet opposite to the driving coil, an outer yoke including the permanent magnet, an elastic member (an upper elastic member and a lower elastic member) for supporting the lens holder in a direction of an optical axis of the lens assembly shiftably, and a base disposed at a lower side of the lens holder. In Patent Document 1, the elastic member (the upper elastic member and the lower elastic member) is disposed in the inside of the outer yoke. The outer yoke comprises an outer hollow cylindrical portion having an inner wall in which the permanent magnet is provided and a ring-shaped end portion disposed at an upper end of the outer hollow cylindrical portion. The upper elastic member is mounted to the outer yoke via a spacer. The base, the lens holder, and the spacer are made of plastic molded parts.

Incidentally, a lens holder driving device as disclosed in the above-mentioned Patent Document 1 moves the lens holder up or down along the direction of the optical axis by flowing a current through the driving coil.

In a case where no current flows through the driving coil, an lower end portion of the lens holder goes and makes contact with an upper surface of the base because the lens holder is urged or energized downwards by the elastic member. In this event, the lens holder has a moving distance (a stroke) (μm) which is equal to 0 μm (or a minimum stroke). The 0 μm (or the minimum stroke) is called an "infinity (INF) position" of the lens holder driving device.

On the other hand, when a current flows through the driving coil, the lens holder gradually moves upward linearly along the direction of the optical axis against a downward urging force of the elastic member. More specifically, when the current flowing through the driving coil goes beyond a first predetermined current value (mA), the lower end portion of the lens holder goes away from the upper surface of the base. The first predetermined current value will be referred to as a lower regulated current value. In addition, when the current flowing through the driving coil reaches a second predetermined current value (mA), an upper end portion of the lens holder goes and makes contact with an inner wall surface of the ring-shaped end portion of the outer yoke. In this event, the moving distance (the stroke) (μm) of the lens holder is equal to a maximum stroke. The maximum distance corresponds to a position which gets near a subject from a "macro position" of the lens holder driving device. In addition, the second predetermined current value will be referred to as an upper regulated current value.

In addition, the macro position is a close-in position for picking up, as the subject, an identifier such as a two-dimensional bar code or the like, and corresponds to a position where a position (a focal distance) between a lens of the camera and the two-dimensional bar code (the subject) is, for example, about 10 cm. On the other hand, the infinity (INF) position is an infinite position for picking up the subject which substantially located at an infinite position, and corresponds to a position between the position (the focal distance) between the lens of the camera and the subject is infinity.

In the manner which is described above, by flowing, through the driving coil, a current between the lower regulated current value and the upper regulated current value, it is possible to move the lens holder to any position between the infinity (INF) position and the macro position. Under the circumstances, it is desirable that the lens holder moves linearly along the direction of the optical axis so as to proportionate to the current value of the current flowing through the driving coil.

However, the present inventor found out that the following malfunctions (problems) occur upon moving the lens holder up to the vicinity of the maximum stroke by making the current flow through the driving coil.

More specifically, in spite of the fact that the current flowing through the driving coil does not reach to the upper regulated current value, there is a case where the upper end portion of the lens holder goes and makes contact with the inner wall surface of the ring-shaped end portion of the outer yoke because the lens holder is sucked to the inner wall surface of the ring-shaped end portion of the outer yoke in the vicinity of the maximum stroke. On the other hand, in spite of the fact that the current flowing through the driving coil makes less than the upper regulated current value, there is a case where the upper end portion of the lens holder does not go away from the inner wall surface of the ring-shaped end portion of the outer yoke and remains in a state where the upper end portion of the lens holder makes contact with the inner wall surface of the ring-shaped end portion of the outer yoke. That is, the present inventor discovered the malfunctions (the problems) so that a range capable of ensuring linearity becomes narrow in a driving response of the lens holder driving device and a margin in the maximum stroke become lost.

SUMMARY OF THE INVENTION

It is therefore an exemplary object of the present invention to provide a lens holder driving device which is capable of ensuring a linearity of a wide range in a driving response.

Other objects of this invention will become clear as the description proceeds.

The present inventor diagnosed the cause of the above-mentioned malfunctions (problems). As a result, the present inventor arrived at a conclusion that the cause is that the lens holder becomes charged when contact between the plastic molded parts is repeated by vibrations or the like and the lens holder is sucked to the inner wall surface of the ring-shaped end portion of the outer yoke in the vicinity of the maximum stroke arising from an effect of static electricity of the lens holder.

Accordingly, this invention have been made by the inspiration of the present inventor in which the above-mentioned malfunctions (problems) are provably resolved if it is possible to reduce the effect of static electricity of the lens holder. Although it is considered various methods of the effect of static electricity of the lens holder, the present invention proposes some problem-solving measures.

On describing the gist of an exemplary aspect of this invention, it is possible to be understood that a lens holder driving device comprises a lens holder in which a lens assembly is mounted, a driving coil fixed to the lens holder at outside circumference thereof, an outer yoke comprising an outer hollow cylindrical portion and a ring-shaped end portion disposed to an upper end of the outer hollow cylindrical portion, a magnet disposed to an inner wall surface of the outer cylindrical portion of the outer yoke so as to be opposite to the driving coil, an elastic member supporting the lens holder in a direction of an optical axis of the lens assembly shiftably, and a base disposed at a lower side of the lens holder. According to the exemplary aspect of this invention, the lens holder driving device comprises a contact area reduction arrangement reducing a contact area between the ring-shaped end portion of the outer yoke and an upper end portion of the lens holder.

DESCRIPTION OF EMBODIMENTS

[Related Art]

Now, the description will proceed to a related art in order to facilitate an understanding of the present invention.

In the manner described above, the lens holder driving device of this type generally comprises a lens holder in which a lens assembly can be mounted, a driving coil fixed to the lens holder at outside circumstance thereof, a permanent magnet opposite to the driving coil, an outer yoke including the permanent magnet, an elastic member (an upper elastic member and a lower elastic member) for supporting the lens holder in a direction of an optical axis of the lens assembly shiftably, and a base disposed at a lower side of the lens holder. The elastic member (the upper elastic member and the lower elastic member) is disposed in the inside of the outer yoke. The outer yoke comprises an outer hollow cylindrical portion having an inner wall in which the permanent magnet is provided and a ring-shaped end portion disposed at an upper end of the outer hollow cylindrical portion. The upper elastic member is mounted to the inner wall surface of the outer yoke via a spacer.

The base, the lens holder, and the spacer are made of plastic molded parts. Herein, it will be presumed that a material of the base is made of a liquid crystal polymer (LCP), a material of the lens holder is made of a polyamide (PA), and a material of the spacer is made of a polycarbonate (PC).

The lens holder driving device comprising such structure moves the lens holder up or down along the direction of the optical axis by flowing a current through the driving coil.

Figure 1:
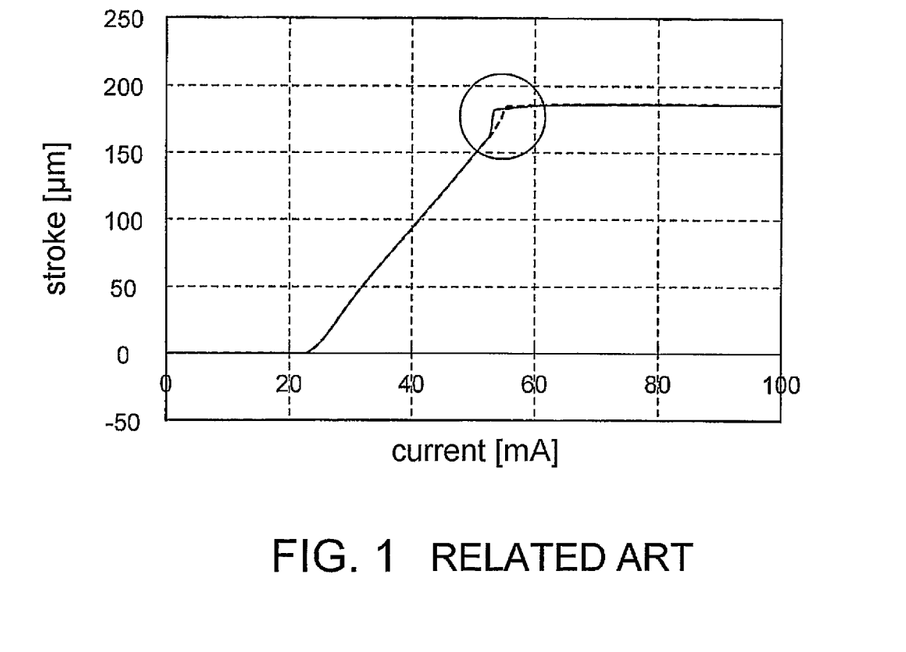
FIG. 1 is a view showing a driving response (a current-stroke characteristic) in a related lens holder driving device.

FIG. 1 is a view showing a driving response (a current-stroke characteristic) in the related lens holder driving device. In FIG. 1, the abscissa represents a current [mA] flowing through the driving coil while the coordinate represents a moving distance (a stroke) [μm] of the lens holder.

In a case where no current flows through the driving coil, an lower end portion of the lens holder goes and makes contact with an upper surface of the base because the lens holder is urged or energized downwards by the elastic member. In this event, the lens holder has a moving distance (a stroke) (μm) which is equal to 0 μm (or a minimum stroke). The 0 μm (or the minimum stroke) is called an "infinity (INF) position" of the lens holder driving device.

On the other hand, when a current flows through the driving coil, the lens holder gradually moves upward linearly along the direction of the optical axis against a downward urging force of the elastic member. More specifically, when the current flowing through the driving coil goes beyond a first predetermined current value (mA), the lower end portion of the lens holder goes away from the upper surface of the base. The first predetermined current value will be referred to as a lower regulated current value which is equal to about 23.4 mA in the example being illustrated in FIG. 1.

In addition, when the current flowing through the driving coil reaches a second predetermined current value (mA), an upper end portion of the lens holder goes and makes contact with an inner wall surface of the ring-shaped end portion of the outer yoke. In this event, the moving distance (the stroke) (μm) of the lens holder is equal to a maximum stroke. The maximum stroke corresponds to a position which gets near a subject from a "macro position" of the lens holder driving device, and the second predetermined current value will be referred to as an upper regulated current value. In the example of FIG. 1, the maximum stroke is equal to about 186 μm and the upper regulated current value is equal to about 56 mA.

Figure 2:
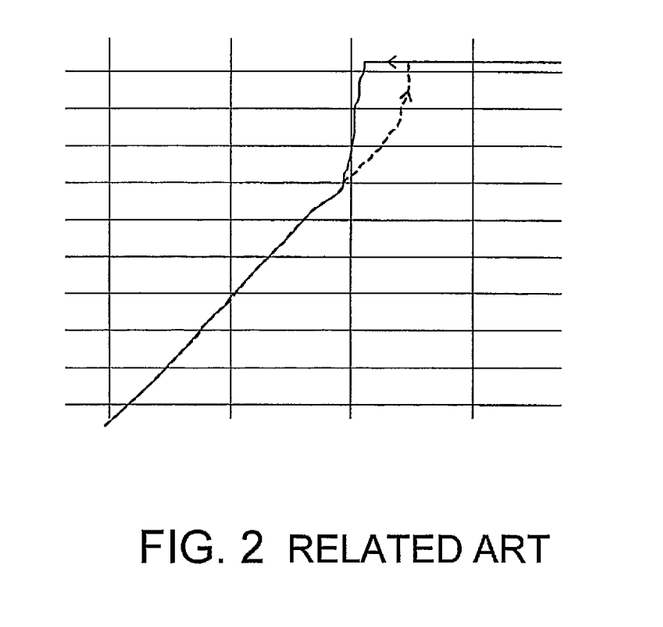
FIG. 2 is an enlarged view showing the vicinity of a maximum stroke (a part enclosed with a circle) of FIG. 1.

FIG. 2 is an enlarged view showing the vicinity of a maximum stroke (a part enclosed with a circle) of FIG. 1

From FIG. 2, it is understood that, in spite of the fact that the current flowing through the driving coil does not reach to the upper regulated current value, the upper end portion of the lens holder goes and makes contact with the inner wall surface of the ring-shaped end portion of the outer yoke because the lens holder is sucked to the inner wall surface of the ring-shaped end portion of the outer yoke in the vicinity of the maximum stroke.

In addition, from FIG. 2, it is understood that, in spite of the fact that the current flowing through the driving coil makes less than the upper regulated current value, the upper end portion of the lens holder does not go away from the inner wall surface of the ring-shaped end portion of the outer yoke and remains in a state where the upper end portion of the lens holder makes contact with the inner wall surface of the ring-shaped end portion of the outer yoke.

In the manner described above, it is understood for the related lens holder driving device that a range capable of ensuring linearity becomes narrow in a driving response thereof and a margin in the maximum stroke become lost.

Referring now to Figures, the description will proceed to exemplary embodiments of the present invention.

[First Exemplary Embodiment]

Figure 3:
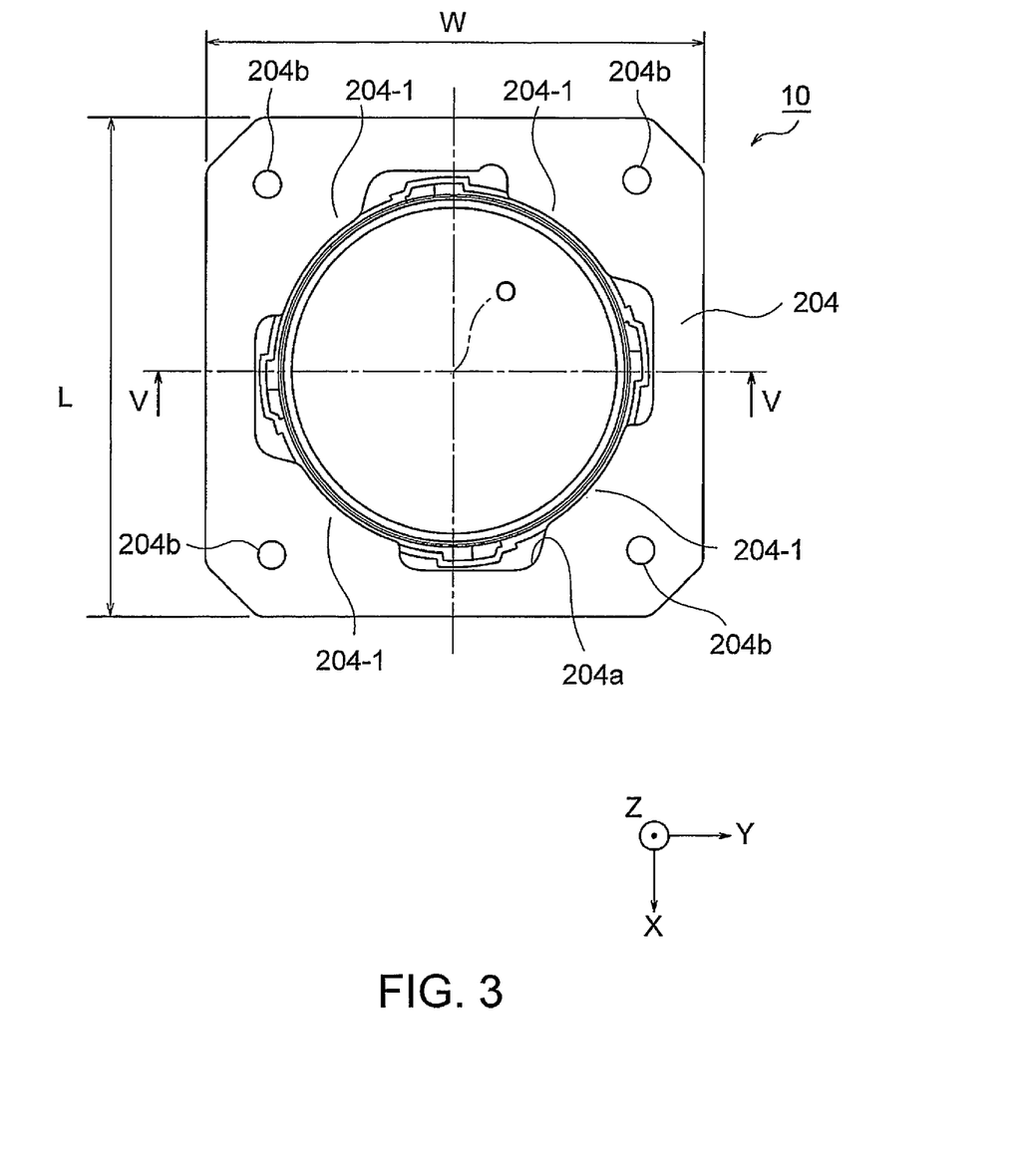
FIG. 3 is a plan view of a lens holder driving device according to a first exemplary embodiment of the present invention.
Figure 4:
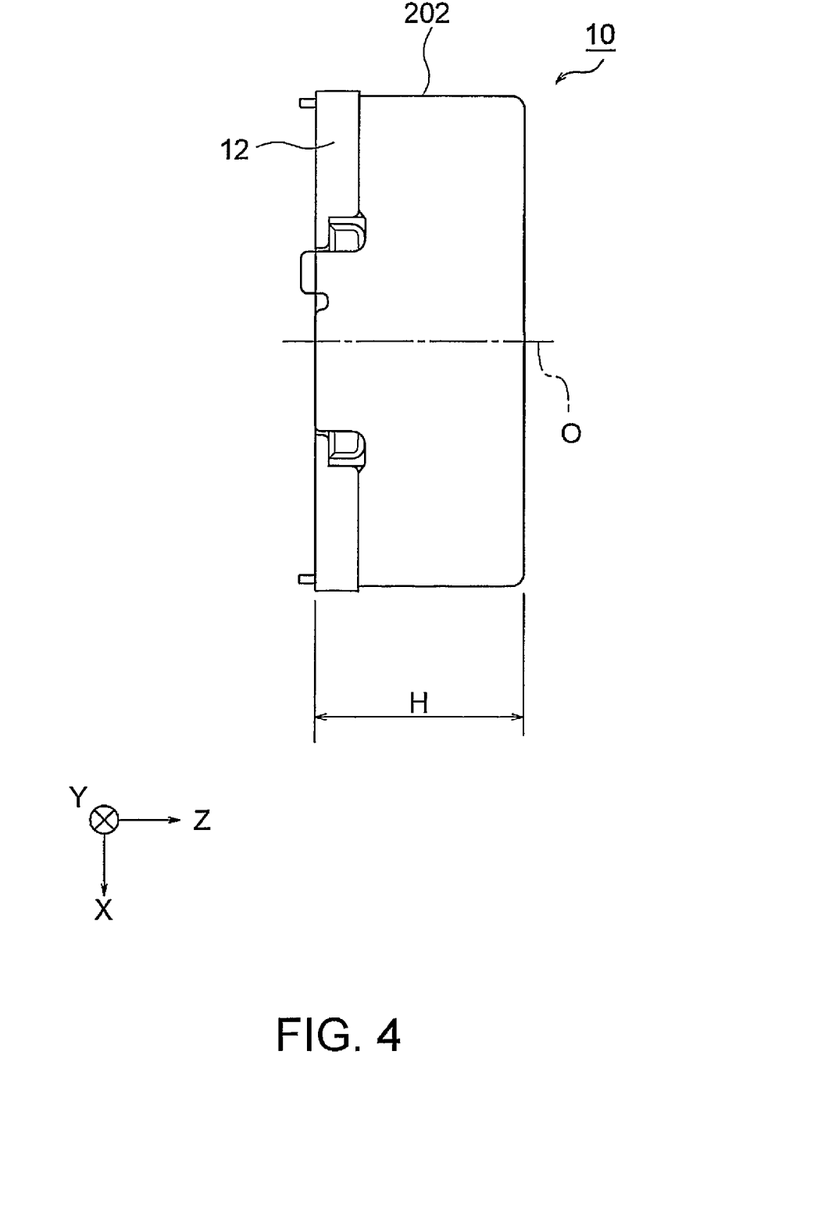
FIG. 4 is a left side view of the lens holder driving device illustrated in FIG. 3.
Figure 5:
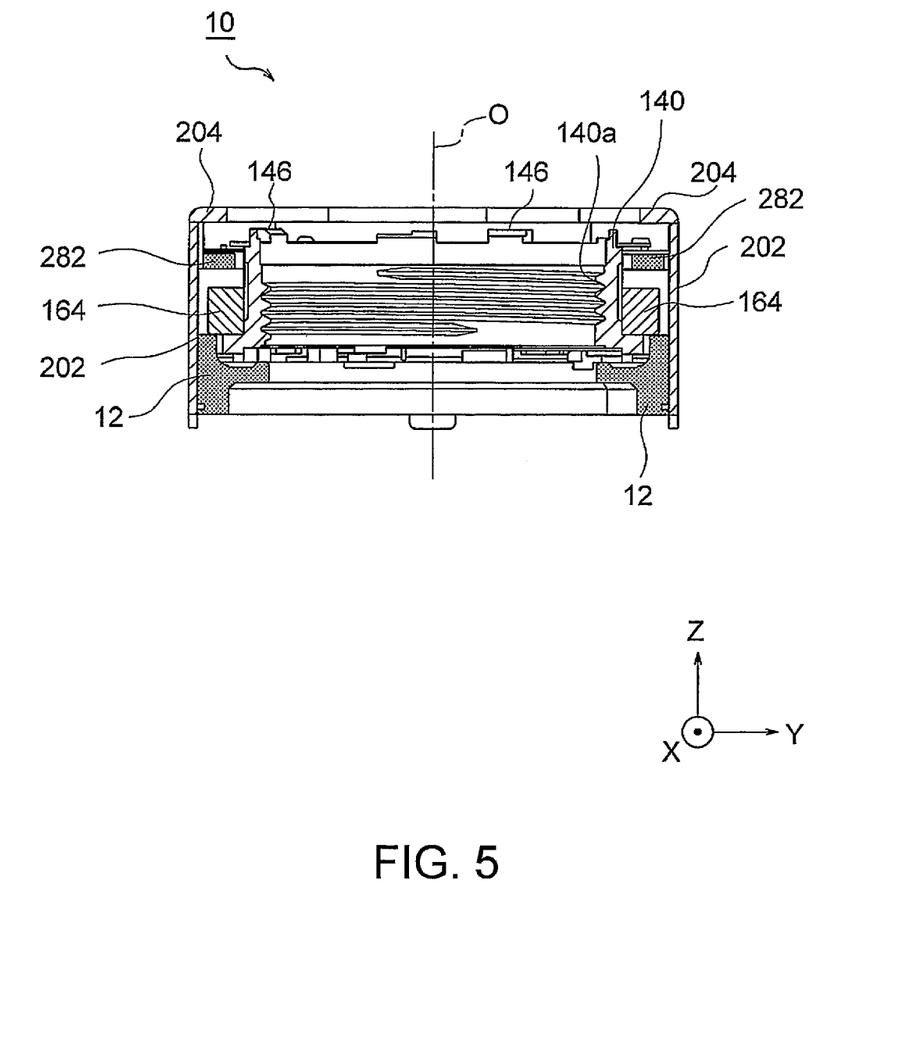
FIG. 5 is a cross-sectional view taken on line V-V of FIG. 3.
Figure 6:
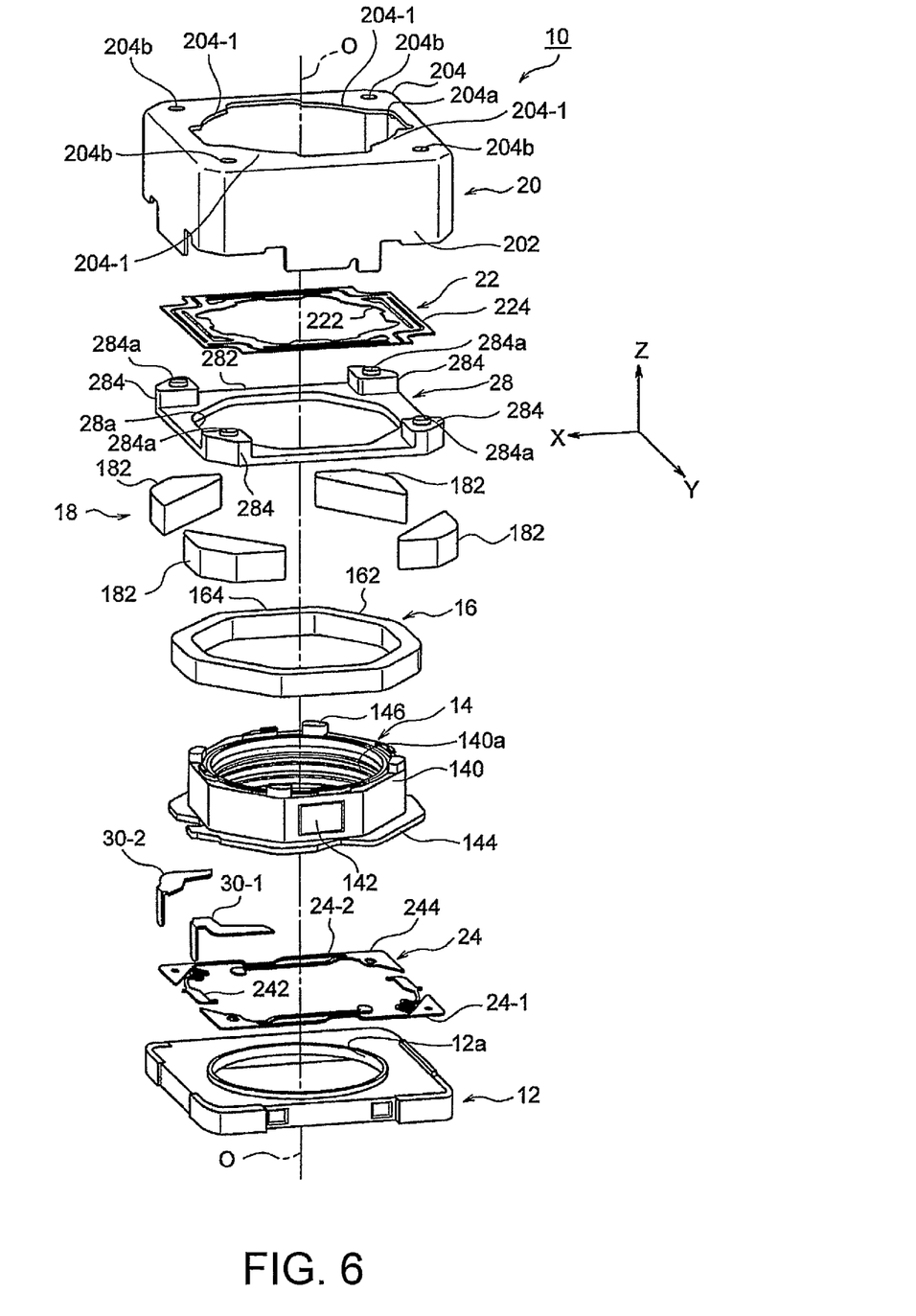
FIG. 6 is an exploded perspective view of the lens holder driving device illustrated in FIG. 3.

Referring to FIGS. 3 through 6, the description will proceed to a lens holder driving device 10 according to an exemplary embodiment of this invention. FIG. 3 is a plan view showing the lens holder driving device 10 and FIG. 4 is a left side view of the lens holder driving device 10. FIG. 5 is a cross-sectional view taken on line V-V of FIG. 3. FIG. 6 is an exploded perspective view of the lens holder driving device 10.

Herein, in the manner shown in FIGS. 3 through 6, an orthogonal coordinate system (X, Y, Z) is used. In a state illustrated in FIGS. 3 through 6, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 3 through 6, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

As shown in FIGS. 3 and 4, the illustrated lens holder driving device 10 has dimensions of a length (L), a width (W), and a height (H) of 7.4 mm, 7.4 mm, and 3.1 mm, respectively.

The illustrated lens holder driving device 10 is a lens holder driving device comprising, as a driving source (a driving method), a driving portion (a VCM method) of "moving coil method" using a voice coil motor (VCM).

The illustrated lens driving device 10 is mounted to a mobile terminal such as a camera-equipped cellular mobile phone which is enable to automatic focusing, a smart phone, a notebook personal computer, a tablet-type personal computer, a mobile-type game machine, a Web camera, a vehicle-mounted camera, or the like.

Figure 7:
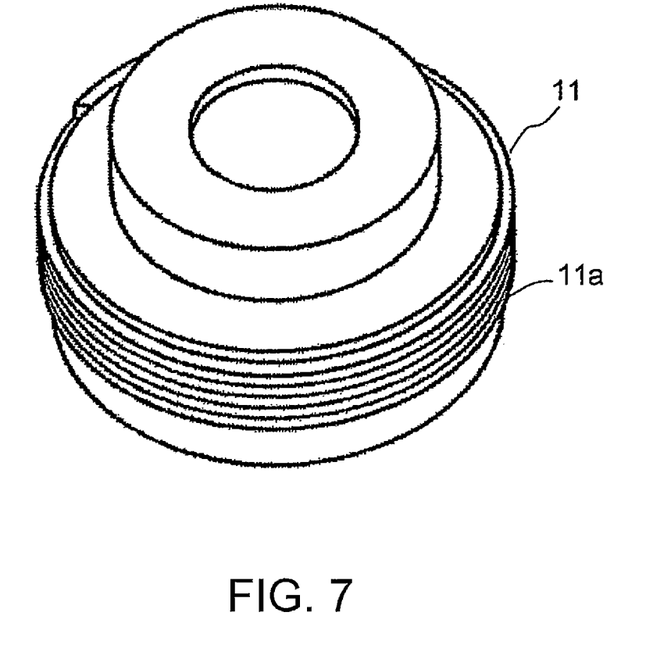
FIG. 7 is a perspective view of a lens assembly mounted in the lens holder driving device illustrated in FIG. 3.

The lens holder driving device 10 is for moving the lens holder 14 (which will later be described) capable of mounting a lens assembly (a lens barrel) 11 as shown in FIG. 7 in the direction of the optical axis O. The lens holder driving device 10 comprises a base 12 which is disposed in a lower side (a rear side) in the Z-axis direction (the direction of the optical axis O). The actuator base 12 has a lower portion (a rear portion) on which an image pickup device 13 disposed on a module board (not shown) is mounted, as shown in FIG. 8.

Figure 8:
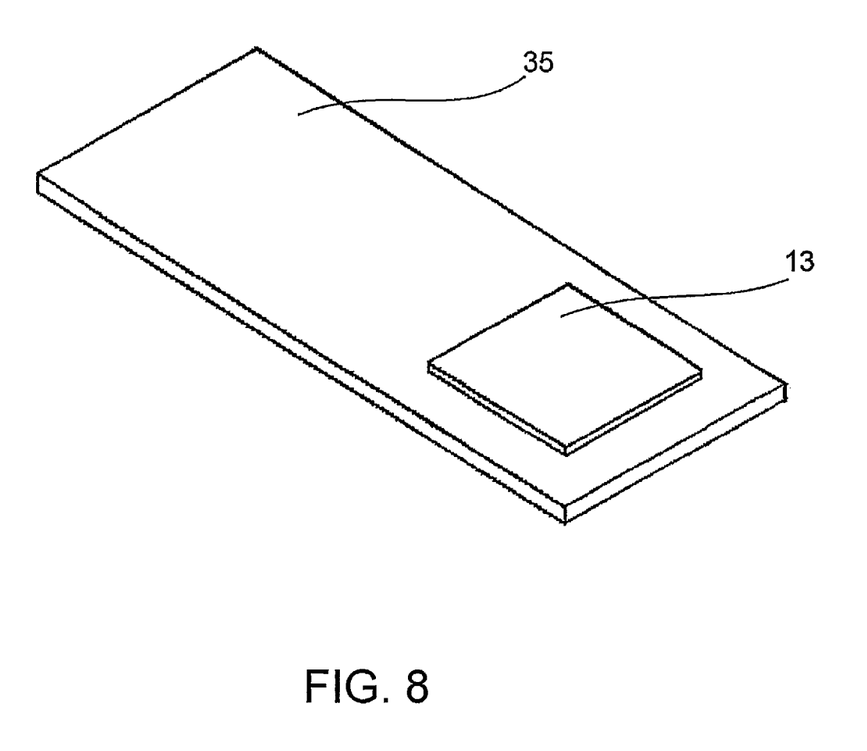
FIG. 8 is a perspective view of a image pickup device mounted on a printed wiring board (PWB) that is mounted in the lens holder driving device illustrated in FIG. 3.

More specifically, as shown in FIG. 8, the image pickup device 13 is mounted on a printed wiring board (PWB) 35. That is, the printed wiring board (PWB) 35 mounts other circuit elements (not shown) as well as the image pickup device 13 thereon which constitute a printed circuit board (PCB). An infrared (IR) cut filter (not shown) is mounted in the module board. The printed circuit board (PCB) is mounted to the base 12 via the module board.

The image pickup device 13 picks up a subject image formed by the lens assembly 11 to convert it into an electric signal. The image pickup device 13 may, for example, comprise a CCD (charge coupled device) type image sensor, a CMOS (complementary metal oxide semiconductor) type image sensor, or the like. Accordingly, a camera module comprises a combination of the lens holder driving device 10, the module board, and the image pickup device 13.

The base 12 has a ring-shape which has the outside shape of rectangular and which has a circular opening portion 12a in the inside thereof. In the example being illustrated, a material of the base 12 comprises a resin having a high size precision and high heat resistance. Such a material may be, for example, a liquid crystal polymer (LCP).

The lens holder driving device 10 comprises the lens holder 14 including a tubular portion 140 for holding the lens assembly (the lens barrel) 11 (FIG. 7), a ring-shaped driving coil 16 fixed to the lens holder 14 so as to position around the tubular portion 140 thereof, a permanent magnet 18 opposite to the driving coil 16, an outer yoke 20 comprising the permanent magnet 18 at an inner wall surface thereof, and a pair of elastic members 22 and 24 disposed to both sides of the tubular portion 140 of the lens holder 14 in the direction of the optical axis O.

In addition, it is desirable that a material of the lens holder 14 comprises a material having high heat resistance and is made, for example, of a polyamide (PA).

A combination of the lens assembly 11 and the lens holder 14 is called a lens body. The permanent magnet 18 and the outer yoke 20 constitute a magnetic circuit (18, 20). A combination of the magnetic circuit (18, 20) and the driving coil 18 comprises the driving portion of the moving coil method.

The pair of elastic members 22 and 24 supports the lens holder 14 in the direction of the optical axis O shiftably so as to position the lens holder 14 in a radial direction. In the pair of elastic members 22 and 24, one elastic member 22 is called an upper elastic member while another elastic member 24 is called a lower elastic member. The illustrated elastic members comprise leaf springs. Accordingly, the upper elastic member 22 is also called an upper leaf spring while the lower elastic member 24 is also called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper elastic member (the upper leaf spring) 22 is also called a front-side spring while the lower elastic member (the lower leaf spring) 24 is also called a rear-side spring.

The upper elastic member (the upper leaf spring; the front-side spring) 22 and the lower elastic member (the lower leaf spring; the rear-side spring) 24 are made, for example, of metal such as a stainless steel or a beryllium copper. In addition, each of the upper elastic member (the upper leaf spring;

the front-side spring) 22 and the lower elastic member (the lower leaf spring; the rear-side spring) 24 is manufactured by a press working against a predetermined thin plate or an etching working using photolithography technique. The etching working is desirable than the press working. This is because residual stress does not remain in the leaf spring in the etching working.

The outer yoke 20 has a rectangular cylindrical shape. Specifically, the outer yoke 20 comprises an outer hollow cylindrical portion 202 having the rectangular cylindrical shape and a rectangular ring-shaped end portion 204 projecting from an upper end (a front end) of the outer hollow cylindrical portion 202 inward. The outer hollow cylindrical portion 202 is also called a shielding yoke. The ring-shaped end portion 204 has an opening 204a at a central portion thereof.

On the other hand, the driving coil 16 has an octagonal cylindrical shape. More specifically, the driving coil 16 comprises four long side portions 162 and four short side portions 164 disposed between the four long side portions 162. The tubular portion 140 of the lens holder 14 has four bonded surfaces 142 which project in the radial direction outward at regular spacings of 90 degrees around the optical axis O. To the four bonded surfaces 142, inner surfaces of the four short side portions 164 of the driving coil 16 are bonded by means of adhesives. In addition, the lens holder 14 has, at a lower end portion thereof, an octagonal ring-shaped ring end portion 144 which projects in the radial direction outward and which is for positioning a bottom portion of the driving coil 16.

In the manner which is described above, the lens holder 14 has the four bonded surfaces 142 for bonding the four areas of the inner surface of the driving coil 16 (that are the inner surfaces of the four short side portions 164 in the example being illustrated) to the tubular portion 140 by means of the adhesives (the adhesive resin).

On the other hand, the permanent magnet 18 comprises four permanent magnet pieces 182 each of which has a substantially triangular pillar shape and which are disposed opposite to the short long side portions 162 of the driving coil 16. The four permanent magnet pieces 182 are disposed to inner walls at four corners of the outer hollow cylindrical portion (the shielding yoke) 202 of the outer yoke 20. In addition, in actuality, each permanent magnet piece 182 is a trapezoid in cross section in a direction orthogonal to the direction of the optical axis O.

In the manner which is described above, the permanent magnet 18 comprises the four permanent magnet pieces 182 each having the substantially triangular pillar shape that are mounted to the four corners of the outer hollow cylindrical portion (the shielding yoke) 202 of the outer yoke 20. In such as a manner, at the inner surfaces of the four corners of the outer hollow cylindrical portion (the shielding yoke) 202 of the outer yoke 20, the permanent magnet 18 is disposed with a space between it and the driving coil 16.

The upper elastic member (the upper leaf spring; the front-side spring) 22 is disposed at an upper side (a front side) of the lens holder 14 in the direction of the optical axis O while the lower elastic member (the lower leaf spring; the rear-side spring) 24 is disposed at a lower side (a rear side) of the lens holder 14 in the direction of the optical axis O.

More specifically, the upper elastic member (the upper leaf spring; the front-side spring) 22 comprises an inner end portion 222 mounted to the upper end portion of the lens holder 14 and an outer end portion 224 mounted on the outer yoke 20 via a spacer 28 in the manner which will later be described. Between the inner end portion 222 and the outer end portion 224, a plurality of arm portions (not shown) are provided. Each arm portion connects the inner end portion 222 to the outer end portion 224.

On the other hand, the lower elastic member (the lower leaf spring; the rear-side spring) 24 comprises an inner end portion 242 mounted on the lens holder 14 at a lower end thereof and an outer end portion 244 mounted on the base 12. Between the inner end portion 242 and the outer end portion 244, a plurality of arm portions (not shown) are provided. Each arm portion connects the inner end portion 242 to the outer end portion 244.

In addition, the inner end portion is also called an inner ring while the outer end portion is also called an outer ring.

The inner end portion 222 of the upper elastic member (the upper leaf spring; the front-side spring) 22 is fixed to the upper end of the lens holder 14. On the other hand, the outer end portion 224 of the upper elastic member (the upper leaf spring; the front-side spring) 22 is fixed to the outer yoke 20 via the spacer 28. In the example being illustrated, a material of the spacer 28 comprises a polycarbonate (PC).

The spacer 28 has a substantially rectangular ring shape which has an opening portion 28a at a central portion thereof. More specifically, the spacer 28 comprises a substantially rectangular ring-shaped holding portion for holding the outer end portion 224 of the upper elastic member (the upper leaf spring; the front-side spring) 22 and four protrusion portions 284 which project at four corners of the ring-shaped holding portion 282 upward and which are mounted to the ring-shaped end portion 204 of the outer yoke 20. The four protrusion portions 284 have four projections 284a which project from upper ends thereof upwards.

On the other hand, the ring-shaped end portion 204 of the outer yoke 20 has, at four corners thereof, four fitting holes 204a in which the four projections 284a of the spacer 28 are fitted.

In addition, the tubular portion 140 of the lens holder 14 has an inner wall in which a female screw thread 140a is cut. On the other hand, as shown in FIG. 7, the lens assembly (the lens barrel) 11 has an outer wall in which a male screw thread 11a screwed in the above-mentioned female screw thread 140a is cut. Accordingly, in a case of fitting the lens assembly (the lens barrel) 11 to the lens holder 14, it includes the steps of rotating the lens assembly (the lens barrel) 11 with respect to the tubular portion 140 of the lens holder 14 around the optical axis O to screw it along the direction of the optical axis O thereby accommodating the lens assembly (the lens barrel) 11 in the lens holder 14, and of connecting them to each other via an adhesive agent or the like.

The lens holder driving device 10 comprises first and second electrode terminals 30-1 and 30-2 which are for supplying the driving coil 16 with power. The base 12 has a pair of insertion holes (not shown) for inserting and setting the first and the second electrode terminals 30-1 and 30-2. In addition, the lower elastic member (the lower leaf spring; the rear-side spring) 24 comprises first and second leaf spring pieces 24-1 and 24-2 which are electrically insulated to each other. The first and the second electrode terminals 30-1 and 30-2 are electrically connected to the first and the second leaf spring pieces 24-1 and 24-2 by means of solder, respectively.

Accordingly, by energizing the driving coil 16 via the first and the second leaf spring pieces 24-1 and 24-2 from the first and the second electrode terminals 30-1 and 30-2, it is possible to positionally adjust the lens holder 14 (the lens assembly 11) in the direction of the optical axis O according to interaction between a magnetic field of the permanent magnet 18 and a magnetic field due to an electric current flowing through the driving coil 16.

In the above-mentioned lens holder driving device 10, a combination of the lens holder 14 for holding the lens assembly 11 and the driving coil 16 serves as a pillar movable portion (14, 16) disposed in a central portion. In addition, a combination of the base 12, the permanent magnet 18, the outer yoke 20, and the spacer 28 acts as a tubular fixed portion (12, 18, 20, 28) disposed around the movable portion (14, 16).

Now, the description will proceed to a stopper in the up direction Z of the lens holder 14.

The ring-shaped end portion 204 of the outer yoke 20 has four yoke protrusion portions 204-1 each of which projects in the radial direction inwards. On the other hand, the tubular portion 140 of the lens holder 14 has four holder upper protrusion portions 146 each of which projects upwards from an upper end thereof.

When the lens holder 14 moves upwards, the four holder upper protrusion portions 146 engage with and stop at the corresponding four yoke protrusion portions 204-1 of the outer yoke 20, respectively. That is, the four yoke protrusion portions 204-1 of the outer yoke 20 act as an upper stopper (engaging/stopping member) for restricting an upward movement of the lens holder 14.

Figure 9:
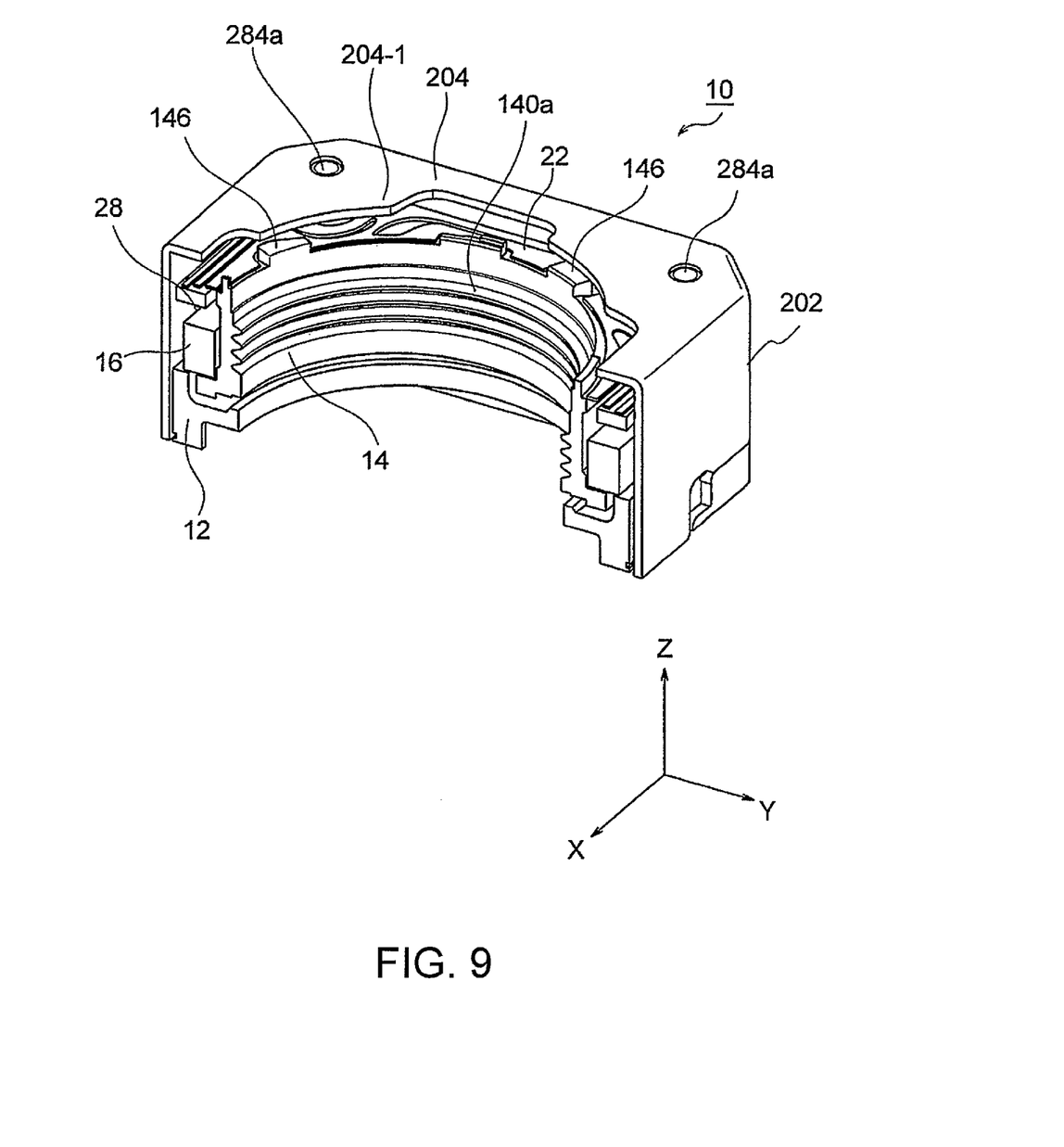
FIG. 9 is a sectional perspective view of the lens holder driving device illustrated in FIG. 3.
Figure 10:
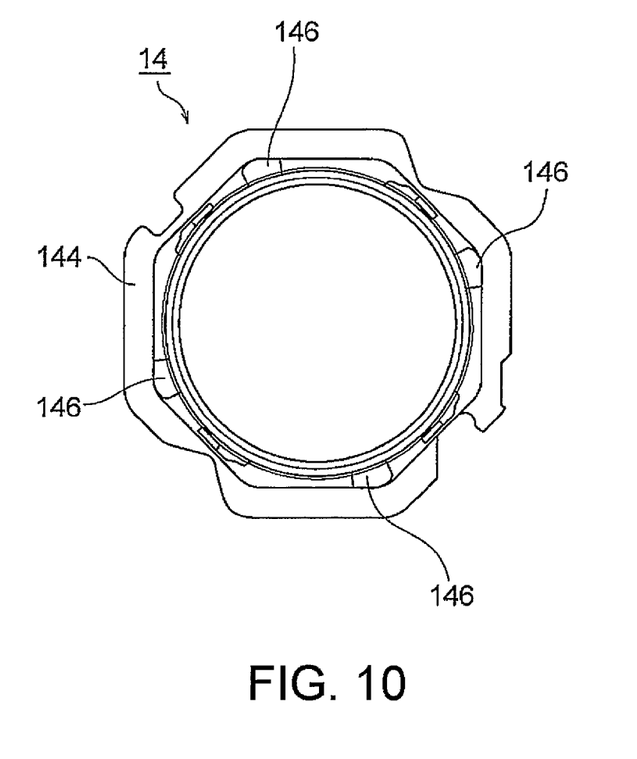
FIG. 10 is a plan view of the lens holder for use in the lens holder driving device illustrated in FIG. 3.
Figure 11:
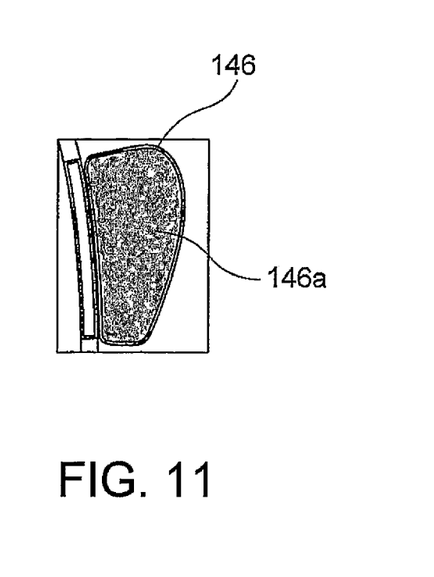
FIG. 11 is a partial enlarged view showing a part of a holder upper protrusion portion of the lens holder illustrated in FIG. 10.

Referring now to FIGS. 9 through 11, the description will proceed to a contact area reduction arrangement according to the exemplary embodiment of this invention.

FIG. 9 is a sectional perspective view of the lens holder driving device 10. FIG. 10 is a plan view of the lens holder 14. FIG. 11 is a partial enlarged view showing a part of the holder upper protrusion portion 146 of the lens holder 14 illustrated in FIG. 10.

As shown in FIG. 10, the tubular portion 140 of the lens holder 14 has the four holder upper protrusion portions 146 each of which projects upwards from the upper end thereof, in the manner which is described above.

Figure 12A:
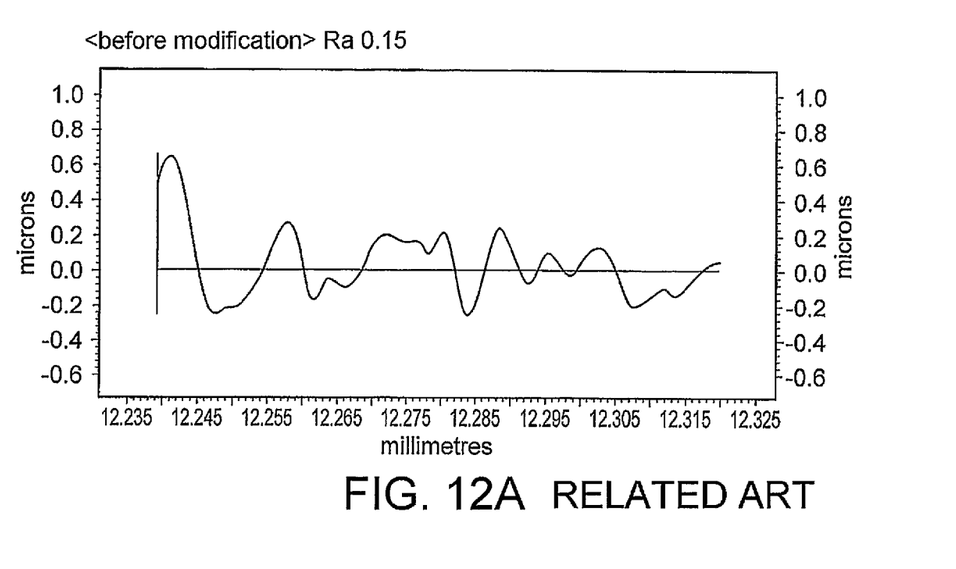
FIG. 12A is a view showing surface roughness data of an upper surface of the holder upper protrusion portions before forming the grain (before modification)
Figure 12B:
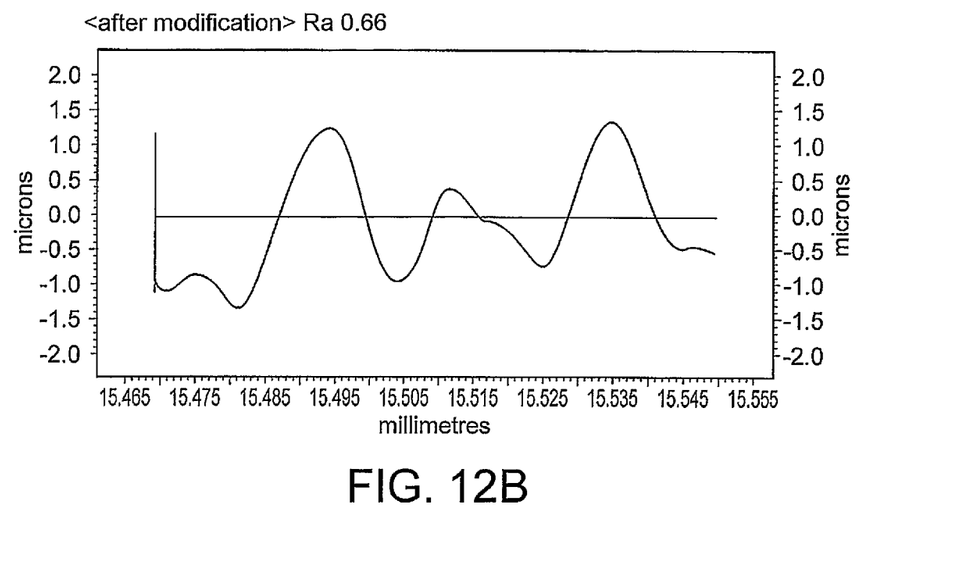
FIG. 12B is a view showing surface roughness data of the upper surface of the holder upper protrusion portions after forming the grain (after modification)

As shown in FIG. 11, in the exemplary embodiment of this invention, the contact area reduction arrangement comprises grain (or wrinkles) 146a formed on an upper surface of the respective holder upper protrusion portions 146. The grain (or the wrinkles) 146a can be formed using an injection molding machine by preliminarily forming wrinkles in a mold or die for use in molding the lens holder 14 at locations corresponding to the four holder upper protrusion portions 146 by sandblasting FIG. 12A shows surface roughness data of the upper surface of the holder upper protrusion portions 146 before forming the grain (before modification) while FIG. 12B shows surface roughness data of the upper surface of the holder upper protrusion portions 146 after forming the grain (after modification).

Arithmetic mean roughness (Ra) before the modification (FIG. 12A) was equal to 0.15 while arithmetic mean roughness (Ra) after the modification (FIG. 12B) was equal to 0.66. Although actual arithmetic mean roughness (Ra) of the upper surface of the holder upper protrusion portions 146 is different in dependence on a molding condition or positions of the mold (the die), the present inventor confirmed that the actual arithmetic mean roughness (Ra) changes a range between a lower limit of 0.4 and an upper limit of 0.9. In addition, the lens holder 14 has a volume resistivity which was equal to $1 \times 10^{12}$ [Ω·cm].

Figure 13:
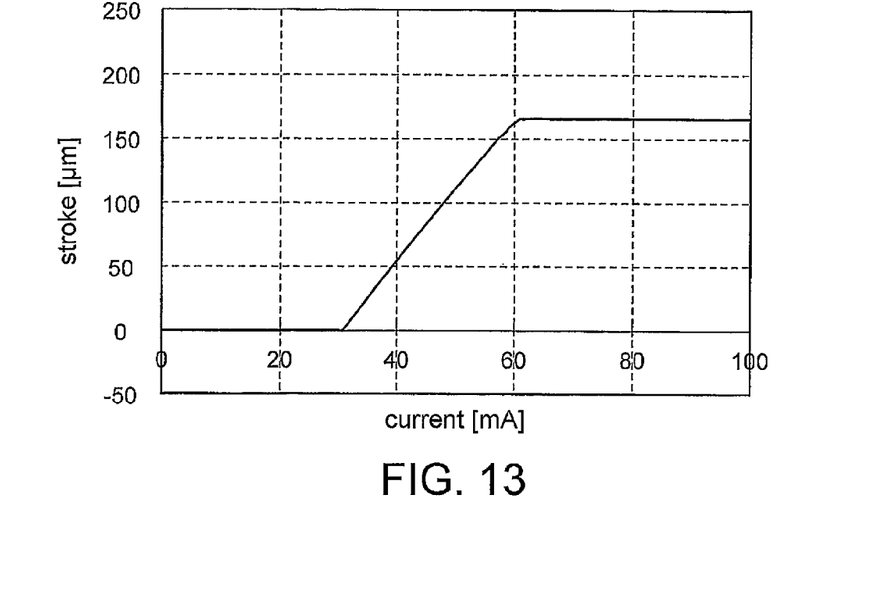
FIG. 13 is a view showing a driving response (a current-stroke characteristic) in the lens holder driving device illustrated in FIG. 3.

FIG. 13 is a view showing a driving response (a current-stroke characteristic) in the lens holder driving device 10. In FIG. 13, the abscissa represents a current [mA] flowing through the driving coil while the coordinate represents a moving distance (a stroke) [μm] of the lens holder.

As apparent from FIG. 13, it is understood for the lens holder driving device 10 that linearity in the driving response is ensured in the vicinity of the maximum stroke as well and a margin in the maximum stroke exists.

[Second Exemplary Embodiment]

The above-mentioned lens holder driving device 10 according to the first exemplary embodiment reduces the contact area by forming the wrinkles 146a on the upper surfaces of the holder upper protrusion portions 146 without making a change to the material of the lens holder 14.

In comparison with this, a lens holder driving device according to a second exemplary embodiment of this invention further makes a change to the material of the lens holder 14. That is, a molded material in which a conductive material is mixed is used as the molded material of the lens holder 14. With this structure, a volume resistivity of the lens holder 14 was equal to $1 \times 10^{11}$ [Ω·cm].

Figure 14:
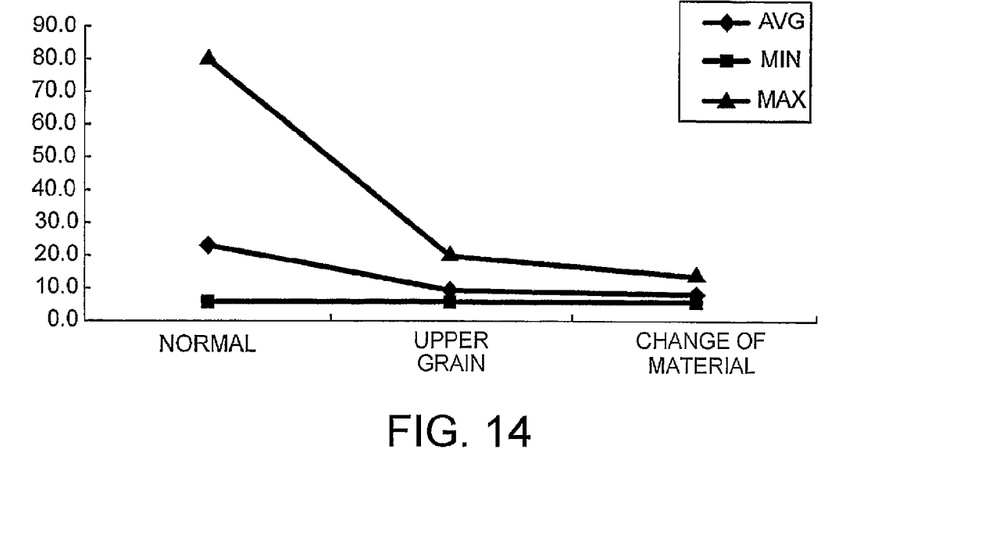
FIG. 14 is a view showing upper hysteresis amounts (μm), in the vicinity of the maximum stroke, of the related art, of the first exemplary embodiment, and of the second exemplary embodiment.

FIG. 14 is a view showing effect of improvement in an upper hysteresis amount (μm) in the vicinity of the maximum stroke. In FIG. 14, a left side shows an upper hysteresis amount (μm) in the related art (NORMAL), a central portion shows an upper hysteresis amount (μm) in the above-mentioned first exemplary embodiment (upper grain), and a right side shows an upper hysteresis amount (μm) in the second exemplary embodiment (changing of material).

From FIG. 14, it is understood that a maximum of the upper hysteresis amount is equal to about 80 μm in the related art, a maximum of the upper hysteresis amount is improved up to about 20 μm in the first exemplary embodiment, and a maximum of the upper hysteresis amount is further improved up to about 15 μm in the second exemplary embodiment This may be considered that static electricity occurring on repeatedly making contact with the molded parts caused by vibrations or the like discharges for a short time because the conductive material is used as the lens holder 14.

In addition, it is preferable that the volume resistivity of the lens holder 14 is lain in a range between $1 \times 10^{7}$ [Ω·cm] and $1 \times 10^{11}$ [Ω·cm], both inclusive. This is because the lens holder 14 easily becomes brittle if a compounding ratio of the conductive material such as conductive carbon is too increased.

Figure 15:
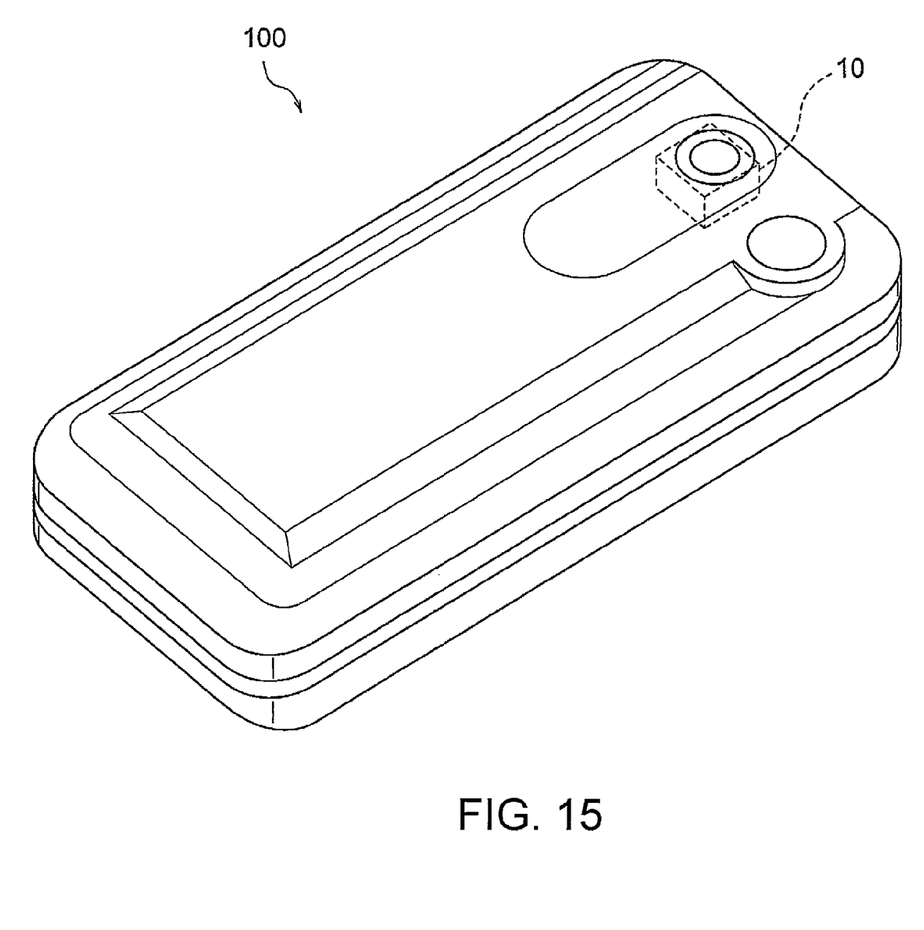
FIG. 15 is a perspective view showing appearance of a camera-equipped mobile terminal (portable device) on which the lens holder driving device illustrated in FIG. 3 is mounted.

FIG. 15 is a perspective view showing appearance of a camera-equipped mobile terminal (portable device) 100 on which the lens holder driving device 10 is mounted. The illustrated camera-equipped mobile terminal 100 comprises a camera-equipped cellular mobile phone and shows a folded state. The lens holder driving device 10 is mounted at a predetermined portion of the camera-equipped mobile terminal 100. With this structure, a user can shoot using the camera-equipped mobile terminal 100.

Although this example shows by taking as an example in a case of the camera-equipped cellular mobile phone as the camera-equipped mobile terminal (portable device) 100, the camera-equipped mobile terminal (portable device) may be a smart phone, a notebook personal computer, a tablet-type personal computer, a mobile-type game machine, a Web camera, and a vehicle-mounted camera.

While this invention has been particularly shown and described with reference to the exemplary embodiment thereof, the invention is not limited to the embodiment. It will be understood by those of ordinary skill in the art that various changes in form and details may be therein without departing from the spirit and scope of the present invention as defined by the claims.

For example, although the above-mentioned exemplary embodiments provide examples of forming the grain 146a on the upper surface of the holder upper protrusion portions 146, this invention is not limited to this. For example, the grain may be formed on an inner wall surface of the ring-shaped end portion 204 of the outer yoke 20 that is an opposite surface making contact with the holder upper protrusion portions 146 or the grain may be formed on both of the upper surface of the holder upper protrusion portions 146 and the inner wall surface of the ring-shaped end portion 204 of the outer yoke 20.

Although the conductive material is used to only the lens holder 14 in the above-mentioned second exemplary embodiment, the conductive material may be used to other plastic molded parts (e.g., the base 12 or the spacer 28 also).

Although different materials are used to the plastic molded parts (the lens holder 14 the base 12, and the spacer 28) in the above-mentioned exemplary embodiments, those plastic molded parts may be configured to the same material (e.g., polyamide (PA)).

Although the description is made by taking, as an example, the lens holder driving device of a type so that the upper end portion of the lens holder makes contact with the ring-shaped end portion of the outer yoke in the above-mentioned exemplary embodiments, this invention may be applied to also a lens holder driving device of a type where the upper end portion of the lens holder makes contact with a cover.

The whole or part of the exemplary embodiments disclosed above can be described as, but not limited to, the following supplementary notes.

(Supplementary note 1) A lens holder driving device (10) comprising:
a lens holder (14) in which a lens assembly (11) is mounted;
a driving coil (16) fixed to said lens holder (14) at outside circumference thereof;
an outer yoke (20) comprising an outer hollow cylindrical portion (202) and a ring-shaped end portion (204) disposed to an upper end of the outer hollow cylindrical portion (202);
a magnet (18) disposed to an inner wall surface of the outer cylindrical portion (202) of said outer yoke (20) so as to be opposite to said driving coil (18);
an elastic member (22, 24) supporting said lens holder (14) in a direction of an optical axis (0) of said lens assembly (11) shiftably; and
a base (12) disposed at a lower side of said lens holder (14), wherein said lens holder driving device (10) comprises a contact area reduction arrangement (146a) reducing a contact area between the ring-shaped end portion (204) of said outer yoke (20) and an upper end portion of said lens holder (14).

(Supplementary note 2) The lens holder driving device (10) according to Supplementary note 1,
wherein the ring-shaped end portion (204) of said outer yoke (20) has a plurality of yoke protrusion portions (204-1) which project in a radial direction inwardly,
wherein said lens holder (14) has a plurality of holder upper protrusion portions (146) which project from an upper end thereof upward,
wherein the plurality of holder upper protrusion portions (146) are engagedly stopped to the plurality of corresponding yoke protraction portions (204-1) of said outer yoke (20), respectively, when said lens holder (14) moves upwards,
wherein said contact area reduction arrangement comprises grain (146a) formed on an upper surface of the plurality of holder upper protrusion portions (146).

(Supplementary note 3) The lens holder driving device (10) according to Supplementary note 1,
wherein said elastic member comprises an upper elastic member (22) disposed at an upper side of said lens holder (14),
wherein said lens holder driving device (10) further comprises a spacer (28) mounted to an inner wall surface of said outer yoke (20) to hold said upper elastic member (22).

(Supplementary note 4) The lens holder driving device (10) according to Supplementary note 3,
wherein said upper elastic member (22) comprises an inner end portion (222) mounted to said lens holder (14) at an upper end portion thereof and an outer end portion (224) mounted to said spacer (28),
wherein the outer cylindrical portion (202) of said outer yoke (20) has a rectangular cylindrical shape and the ring-shaped end portion (204) of said outer yoke (20) has an rectangular outside shape,
wherein said spacer (28) comprises:
a rectangular ring-shaped holding portion (282) holding the outer end portion (224) of said upper elastic member (22); and
four protrusion portions (284) which project at four corners of said ring-shaped holding portion (282) upward and which are mounted to the ring-shaped portion (204) of said outer yoke (20).

(Supplementary note 5) The lens holder driving device (10) according to Supplementary note 4,
wherein said magnet (18) comprises four permanent magnet pieces (182) which are mounted to four corners of the outer hollow cylindrical portion (202) of said outer yoke (20).

(Supplementary note 6) The lens holder driving device (10) according to Supplementary note 3, wherein said elastic member further comprises a lower elastic member (24) disposed at a lower side of said lens holder (14).

(Supplementary note 7) The lens holder driving device (10) according to Supplementary note 6, wherein said lower elastic member (24) comprises an inner end portion (242) mounted to said lens holder (14) at an lower end portion thereof and an outer end portion (144) mounted to said base (12).

(Supplementary note 8) The lens holder driving device (10) according to Supplementary note 1, wherein said lens holder (14) is made of a molded material in which a conductive material is mixed.

(Supplementary note 9) The lens holder driving device (10) according to Supplementary note 3, wherein said lens holder (14), said base (12), and said spacer (28) are made of the same material.

(Supplementary note (10) The lens holder driving device (10) according to Supplementary note 1, wherein said base (12) mounts an image pickup device (13) thereon.

(Supplementary note 11) A mobile device (100) in which the lens holder driving device (10) according to Supplementary note 10 is mounted.

In this connection, inasmuch as reference symbols in parentheses are attached in order to facilitate an understanding of this invention and are merely one example thereof, this invention is, of course, not limited to them.

What is claimed is:

1. A lens holder driving device comprising:
a lens holder in which a lens assembly is mounted;
a driving coil fixed to said lens holder at outside circumference thereof;
an outer yoke comprising an outer hollow cylindrical portion and a ring-shaped end portion disposed to an upper end of the outer hollow cylindrical portion;
a magnet disposed to an inner wall surface of the outer cylindrical portion of said outer yoke so as to be opposite to said driving coil;
an elastic member supporting said lens holder in a direction of an optical axis of said lens assembly so that said lens assembly is shiftable along the direction of the optical axis; and
a base disposed at a lower side of said lens holder, wherein said lens holder has a holder upper protrusion portion that projects upward from an upper end thereof, wherein the holder upper protrusion portion engages with and stops at the ring-shaped end portion when said lens holder moves upwards, wherein said lens holder driving device comprises a contact area reduction arrangement that reduces a contact area between an inner wall surface of the ring-shaped end portion of said outer yoke and an upper surface of the holder upper protrusion portion of said lens holder as compared with a case in which the upper surface of the holder upper protrusion potion is flat.

2. The lens holder driving device as claimed in claim 1, wherein the ring-shaped end portion of said outer yoke spacer has a plurality of yoke protrusion portions which project inwardly in a radial direction, wherein said lens holder has a plurality of the holder upper protrusion portions, which project upward from the upper end thereof, wherein the plurality of holder upper protrusion portions engages with and stops at the plurality of yoke protraction portions of said outer yoke, respectively, when said lens holder moves upwards.

3. The lens holder driving device as claimed in claim 1, wherein said elastic member comprises an upper elastic member disposed at an upper side of said lens holder, and wherein said lens holder driving device further comprises a spacer mounted to an inner wall surface of said outer yoke to hold said upper elastic member.

4. The lens holder driving device as claimed in claim 3, wherein said upper elastic member comprises an inner end portion mounted to said lens holder at an upper end portion thereof and an outer end portion mounted to said spacer, wherein the outer cylindrical portion of said outer yoke has a rectangular cylindrical shape and the ring-shaped end portion of said outer yoke has a rectangular outside shape, and wherein said spacer comprises:

a rectangular ring-shaped holding portion holding the outer end portion of said upper elastic member; and four protrusion portions which project upward at four corners of said ring-shaped holding portion, and which are mounted to the ring-shaped end portion of said outer yoke.

5. The lens holder driving device as claimed in claim 4, wherein said magnet comprises four permanent magnet pieces which are mounted to four corners of the outer hollow cylindrical portion of said outer yoke.

6. The lens holder driving device as claimed in claim 3, wherein said elastic member further comprises a lower elastic member disposed at a lower side of said lens holder.

7. The lens holder driving device as claimed in claim 6, wherein said lower elastic member comprises an inner end portion mounted to said lens holder at a lower end portion thereof and an outer end portion mounted to said base.

8. The lens holder driving device as claimed in claim 1, wherein said lens holder is made of a molded material in which a conductive material is mixed.

9. The lens holder driving device as claimed in claim 3, wherein said lens holder, said base, and said spacer are made of the same material.

10. The lens holder driving device as claimed in claim 1, wherein said base mounts an image pickup device thereon.

11. A mobile device in which the lens holder driving device as claimed in claim 10 is mounted.

12. The lens holder driving device as claimed in claim 1, wherein said contact area reduction arrangement comprises grains formed on the upper surface of the holder upper protrusion portion.

* * * * *